United States Patent
Diekhans

[19]

[11] Patent Number: 6,101,795
[45] Date of Patent: Aug. 15, 2000

[54] AUTOMATIC STEERING MECHANISM AND METHOD FOR HARVESTING MACHINE

[75] Inventor: Norbert Diekhans, Gütersloh, Germany

[73] Assignee: Claas KGaA, Harsewinkel, Germany

[21] Appl. No.: 09/076,160

[22] Filed: May 12, 1998

[30] Foreign Application Priority Data

May 13, 1997 [DE] Germany ............... 197 19 939

[51] Int. Cl.$^7$ .................................. A01D 75/00
[52] U.S. Cl. .................. 56/10.2 F; 56/DIG. 15; 701/25; 701/50; 180/401
[58] Field of Search ............ 56/10.2 F, 10.2 D, 56/10.2 A, 119, DIG. 7, DIG. 15; 701/50, 23, 25; 180/401

[56] References Cited

U.S. PATENT DOCUMENTS

| | | | |
|---|---|---|---|
| 3,946,825 | 3/1976 | Gail ........................................ | 180/401 |
| 3,952,828 | 4/1976 | Stampfer et al. .................. | 180/401 X |
| 4,077,488 | 3/1978 | Bennett, Jr. et al. ............... | 180/401 X |
| 4,304,316 | 12/1981 | Lang ....................................... | 180/401 |
| 4,868,752 | 9/1989 | Fuji et al. ............................. | 701/50 X |
| 5,234,070 | 8/1993 | Noah et al. .......................... | 180/401 X |
| 5,715,665 | 2/1998 | Diekhans et al. ..................... | 56/10.2 F |
| 5,715,666 | 2/1998 | Huster et al. ......................... | 56/10.2 F |
| 5,828,971 | 10/1998 | Diekhans et al. . | |
| 5,911,669 | 6/1999 | Stentz et al. ......................... | 701/50 X |

FOREIGN PATENT DOCUMENTS

| | | |
|---|---|---|
| 21 45 717 B2 | 3/1973 | Germany . |
| 2 224 205 | 11/1973 | Germany . |
| 24 08 872 B1 | 8/1975 | Germany . |
| 24 55 836 B2 | 8/1976 | Germany . |
| 24 55 836 C3 | 8/1976 | Germany . |
| 91 03 030 U1 | 8/1991 | Germany . |
| 42 20 913 A1 | 1/1994 | Germany . |
| 42 20 913 C2 | 1/1994 | Germany . |
| 195 08 941 A1 | 9/1996 | Germany . |
| 195 14 223 A1 | 10/1996 | Germany . |
| 1 364 400 | 4/1973 | United Kingdom . |

*Primary Examiner*—H. Shackelford
*Attorney, Agent, or Firm*—Husch & Eppenberger, LLC; Robert E. Muir

[57] ABSTRACT

A harvesting machine with an automatic steering mechanism consists of a self-propelled machine with a cutterbar mounted in the driving direction. The harvesting machine also has generally-known locating devices to scan the crop edge, in particular, the border between the mowed and unmowed crops. The location devices produce signals that are processed by a controller and, via devices well-known in the art, are utilized by the automatic steering mechanism. The crop edge is scanned in at least two variable distances in front of the cutterbar. The controller processes at least two locating signals received in variable scanning distances in front of the cutterbar. The locating signals are used by devices well-known in the art for the automatic steering mechanism.

34 Claims, 3 Drawing Sheets

AUTOMATIC STEERING MECHANISM AND METHOD FOR HARVESTING MACHINE

BACKGROUND OF THE INVENTION

The present invention relates generally to agricultural machinery and, more particularly, to improvements to harvesting machines for agricultural crops.

Some harvesting machines are self-propelled and have a cutterbar, or mowing unit, and a locating device to scan the crop edge for steering orientation. Such a harvesting machine is disclosed in German Patent application 24 55 836. This harvesting machine scans the crop edge within a certain distance via a reflex position locator, either by means of light beams or ultrasonic waves, without physical contact in front of the cutterbar. However, in the harvesting process the automatic steering mechanism of the afore-mentioned harvesting machine has led to irregular tracks and non-uniform crop edges. Furthermore, during operation of the harvesting machine on a hillside, the hill drift-away effect of the automatically-steerable harvesting machine is not sufficiently compensated.

It is an object of the present invention to overcome one or more of the above-described deficiencies. Another object is to improve the aforementioned harvesting machine by producing a rugged and more reliable automatic steering mechanism for harvesting machines.

SUMMARY OF THE INVENTION

In accordance with the present invention there is provided a self-propelled harvesting machine for harvesting agricultural crops and including steerable wheels, a cutterbar, a locating device which determines the crop edge and produces locating signals, a controller for receiving the locating signals, and a steering mechanism for the steerable wheels; wherein the locating device is constructed and arranged to sense the crop edge in front of the cutterbar in at least two separate distances and produces at least two separate locating signals; and the controller processes the two locating signals received to determine the path of travel and controls the steering mechanism accordingly.

According to the invention, the automatically-steered harvesting machine has at least one generally-known locating device to scan the crop-edge. To facilitate automatic steering, the locating signals are fed to a controller, such as electronic circuits or a micro-controller, where they are processed. In addition to the locating signals, the controller also receives the harvesting machine's actual steering lock angle values from the steerable wheels in a manner known in the art, and operates via well-known hydraulic devices to adjust the steerable wheels. Such devices are, for example, a hydraulic steering cylinder, which is controlled by an electrically actuated hydraulic control valve filled with hydraulic fluid.

In the preferred embodiment of the invention, the controller for the automatic steering mechanism processes two or more reported locating signals in variable scanning distances mounted in front of the cutterbar. This arrangement provides a harvesting machine with automatic steering mechanism with durable operating controls and enhanced reliability.

In accordance with another aspect of the present invention there is provided a method for automatically steering a self-propelled harvesting machine which has a cutter bar, steerable wheels, and a steering mechanism for the steerable wheels; the method including the steps of: sensing the crop edge in front of the cutterbar in at least two separate distances and producing at least two separate locating signals; processing the two locating signals received to determine the path of travel for the machine; and controlling the steering mechanism accordingly.

BRIEF DESCRIPTION OF THE DRAWINGS

Reference is now made to the drawings which illustrate the best known mode of carrying out the invention and which show a system and examples for putting the method into practice.

DETAILED DESCRIPTION

Figure 1:
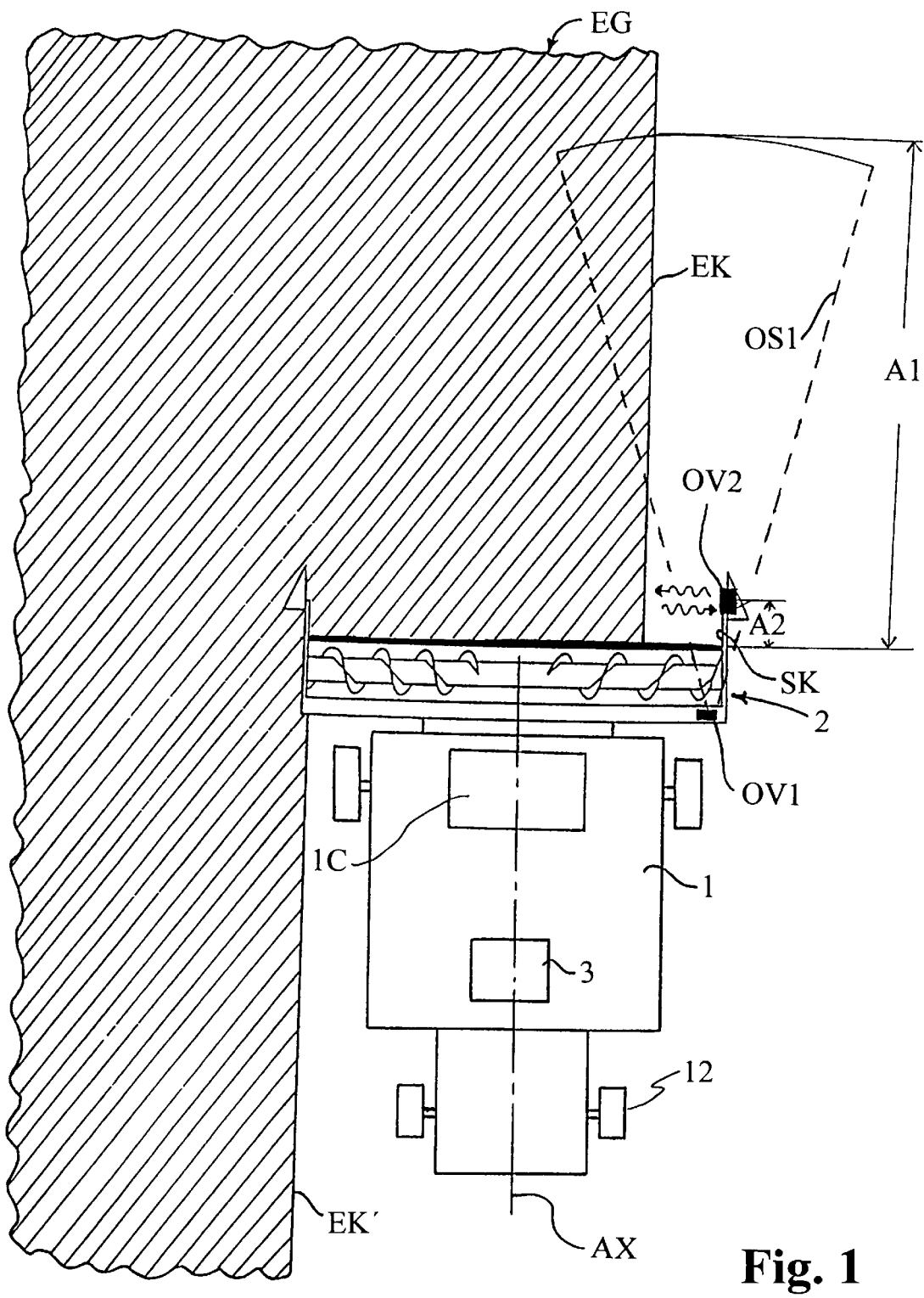
FIG. 1 is a top plan view of a harvesting machine with an automatic steering mechanism in operation during a harvesting function.
Figure 2:
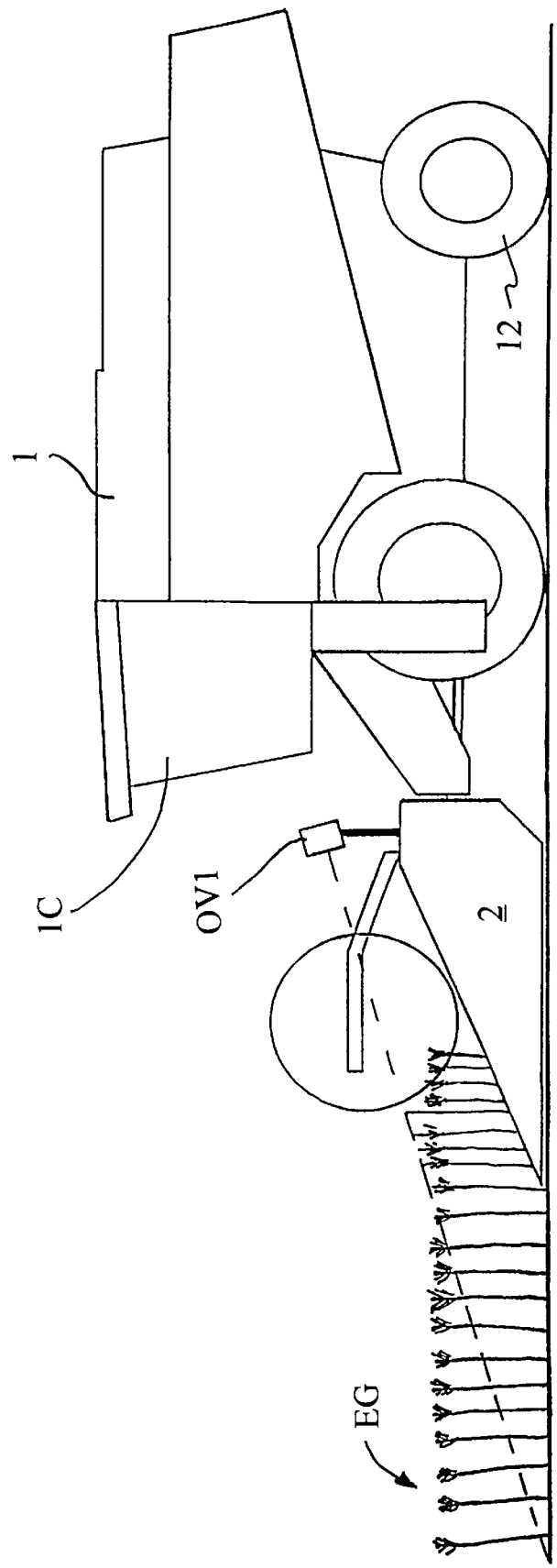
FIG. 2 is a side elevation view of the harvesting machine shown in FIG. 1.

FIG. 1 shows a harvesting machine 1 with an automatic steering system performing the harvesting function, for example, in a grain field. The harvesting machine 1 is advantageously a self-propelled combine with a cutterbar 2. Two locating devices OV1, OV2 scan a crop edge EK in two variable distances A1, A2 in front of the cutterbar 2. The scanning point of the crop edge EK scanned by the first locating device OV1 lies in the "distant area" approximately 10 to 50 feet, and preferably 26 to 33feet in front of the cutterbar 2. For the first locating device OV1, one skilled in the art can use a reflex locating device which, as seen in FIG. 2, is mounted above the top of the crop EG and sends locating beams OS1 slightly downwardly tilted toward the ground. FIG. 2 shows a side elevation view of the harvesting machine 1 displaying the mounting position of the first locating device OV1 on the cutterbar 2 and the way in which the locating beams OS1 travel outwardly and downwardly. The locating beams OS1 scan both sides of the crop edge EK; i.e. the cut and the uncut portion of the field. In FIG. 1, the first reflex locating device OV1 is shown in the form of a laser scanner with a laser beam sending and receiving device whose laser locating beams OS1 are periodically and continually oscillated in a certain angle area. Instead of a laser scanner, one skilled in the art can also use other locating apparatus such as an ultrasonic sensor with an ultrasonic sending and receiving device for the first locating device OV1. For the distant or first locating device OV1, one skilled in the art also may use a digital camera positioned above the crops EG and tilted downwardly toward the field. The camera's surveying area in front of the cutterbar 2 for scanning the crop edge EK is evaluated via digital image processing. Using such distant locating device OV1, the position of the crop edge EK can only be determined in one spot within the camera's surveying area and the position of this spot can be used as a locating signal for an automatic steering mechanism hereafter described. As an alternative, the crop edge EK can be determined in two or more spots in the camera's surveying area, and the position of these spots can be used for the automatic steering mechanism. We will not go into more detail regarding the design of these generally-known locating devices or the evaluation of the reflecting locating beams to recognize the border between the mowed and non-mowed crops. One may rely on procedures and devices well-known in the art.

The locating device OV1 is preferably mounted on the cutterbar's 2 left or right border edge SK in such a manner that the center point beam of the locating device OV1 is directly aligned with the cutterbar's 2 border edge SK. In a design not shown, the first locating device OV1 may be mounted elsewhere on the machine 1; for example on an operator's cab 1C. In such a case, the position of the first locating device OV1 and its signals OS1 will be taken into account via geometric relations in the evaluation of locating signals OS1. However, with the arrangement of the first locating device OV1 directly on the moving unit's 2 border edge, the processing in the controller 3 for the automatic steering provides especially advantageous and easy-to-define geometric relations.

The second locating device 0V2 for the "short range area" as shown in FIG. 1 is also mounted on the cutterbar's 2 border edge SK. The second locating device OV2 scans the distance (shown by wavy lines in FIG. 1) between the border edge SK and the crop edge EK via a sensor such as an ultrasonic sensor. One can also utilize a mechanical sensing head (not shown), which is moved in place by the crop edge whose excursion is measured. The second locating device OV2 is designed for determining the distance between the cutterbar 2 border edge SK and the crop edge EK. This is advantageous for defining and controlling the cutterbar's 2 utilization rate. In conjunction with an on-line yield data acquisition system (not shown), this can be provide a more accurate area determination and, as a result, a more accurate yield mapping.

Figure 3:
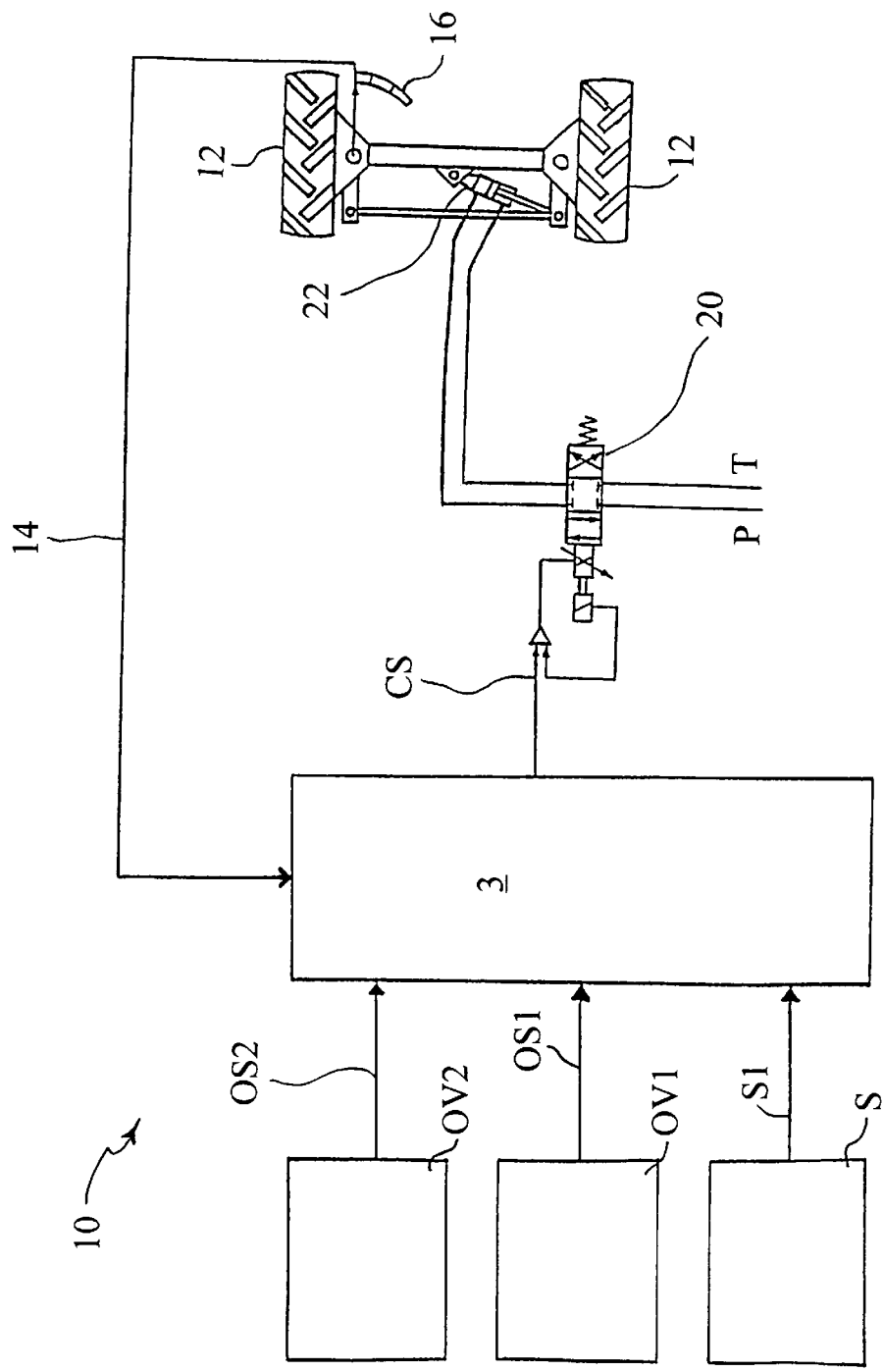
FIG. 3 is a schematic drawing of a controller and a steering device.

FIG. 3 shows the devices which comprise a harvesting machine's 1 automatic steering mechanism 10 with a pair of interconnected steerable wheels 12 which may be the rear wheels. The invention is not limited to harvesting machines 1 with wheels 12, but can also be used for harvesting machines with crawler tracks. The controller 3 receives the locating signals OS1, OS2 from the two locating devices OV1, OV2; an actual steering angle value 14 as indicated by a steering angle sensor 16; and a signal S1 for the machine speed S. Via an implemented norm algorithm, the controller 3 determines a control signal CS for an electrically-actuated, hydraulic control valve 20, which controls the flow of hydraulic fluid from a pump P to a steering cylinder 22 for adjustment, i.e. steering, of the wheels 12. The control valve 20 also controls the return flow of hydraulic fluid from the steering cylinder 22 to a tank T.

The harvesting machine's 1 automatic steering mechanism 10 causes a smoothing of the tracks along a harvested crop edge EK' because of increased accuracy and, thus, less hunting by the hydraulic components 20, 22. This results from processing of the various locating signals OS1, OS2 in the controller 3 (e.g., the algorithm implemented in a microcontroller). As described above, the harvesting machine 1 has two locating devices OV1, OV2 to scan the crop edge EK in two variable distances A1, A2. One locating device OV1 or OV2 scans the crop edge EK in the distant range area, for example 26 to 32 feet in front of the cutterbar 2, and the other locating device OV1 or OV2 scans the crop edge EK in the short range area directly in front of, more specifically in the catchment area of, the cutterbar 2. This double sensing or measurement gives improved accuracy. For example, the locating signals OS2 of the second locating device OV2 serve as an adjustment signal for an auto-pilot function, which primarily follows the distant scanning signals OS1 of the first locating device OV1. In addition, the amount or degree in which the locating signals OS1, OS2 influence the automatic steering mechanism 10 can be evaluated and/or moderated depending on the driving speed S.

With an especially simple control calculation, the short range signal OS2 acts upon the distant signal OS1 only when there is a pre-set deviation from the rate of utilization of the cutterbar 2. In this manner the cutterbar 2 will be sufficiently utilized, thus ensuring crops EG remaining in the field will be mowed. At the same time steering changes to wheels 12 via hydraulic components 20, 22 are minimized.

From the two or more locating signals OS1, OS2 operating at variable scanning distances in front of the cutterbar or mowing unit 2, the direction angles between the crop edge EK, which generally proceeds linearly, and the harvesting machine's longitudinal axis AX, can be accurately determined and can be used for the automatic steering control. With this steering strategy, the harvesting machine's longitudinal axis AX is guided parallel to the crop edge EK. As a result, the controller 3 effectively minimizes each of the above-mentioned direction angles to zero.

Furthermore, by using a plurality of locating signals OS1, OS2 operating at variable scanning distances in front of the cutterbar 2, the distance between the left, or alternatively the right, cutterbar border edge SK and the crop edge EK can be determined. Thus, when working alongside a hill, the hill drift-away effect of the harvesting machine 1 is compensated in a very advantageous manner in the event that the distance between the cutterbar boundary edge SK and the crop edge EK deviates from a pre-set value, although the harvesting machine 1 correctly moves along the crop edge EK.

In addition, there is provided a means to continuously store in memory of the controller 3 the scanned positions of the crop edges EK which are scanned by at least one of the two locating devices OV1, OV2. This is done to determine and store the course of the crop edge EK and to process the course of the crop edge EK by the automatic steering system's controller 3. The mean of the scanned course of the crop edge EK is determined by the sliding mean value over a certain time window.

Another advantageous embodiment of the present invention has a single locating device OV1 which is pivotal around its axis and depending on the pivoting angle, the locating device OV1 scans the crop edge EK in front of the cutterbar 2 at both variable distances A1, A2. In this case, a second locating device OV2 becomes unnecessary because both signals OS1, OS2 are generated from one locating device OV1.

Other objects, features and advantages will be apparent to those skilled in the art. While preferred embodiments of the present invention have been illustrated and described, this has been by way of illustration and the invention should not be limited except as required by the scope of the appended claims.

I claim:

1. In a self-propelled harvesting machine for harvesting agricultural crops and including steerable wheels, a cutterbar, a locating device which determines the crop edge and produces locating signals, a controller for receiving the locating signals, and a steering mechanism for the steerable wheels; the improvement comprising that the locating device is constructed and arranged to sense the standing crop edge in two separate distances in front of the cutterbar and produces two separate locating signals; and the controller processes the received two locating signals together to determine the path of travel and controls the steering mechanism accordingly.

2. A harvesting machine according to claim 1, wherein from the at least two locating signals operating at variable scanning distances in front of the cutterbar, the controller determines the direction angles between the harvesting machine's longitudinal axis and the crop edge and controls the steering mechanism.

3. A harvesting machine according to claim 1, wherein from the at least two locating signals operating at variable scanning distances in front of the cutterbar, the controller determines the distance between the cutterbar's border edge and the crop edge and controls the steering mechanism.

4. A harvesting machine according to claim 1, including at least a first and a second locating device to sense the crop edge at separate distances.

5. A harvesting machine according to claim 4, wherein said locating devices scan the crop edge in one variable distance each in front of the cutterbar.

6. A harvesting machine according to claim 4, wherein said first locating device is designed as a non-contact reflex locating device mounted above the crops with locating beams that face forward in a tilted position towards the ground.

7. A harvesting machine according to claim 6, wherein said locating beams oscillate across the crop edge to be scanned.

8. A harvesting machine according to claim 4, wherein said locating device scans the crop edge at a distance approximately 10 to 50 feet in front of the cutterbar.

9. A harvesting machine according to claim 4, wherein said locating device scans the crop edge in a distance approximately 26 to 33 feet in front of the cutterbar.

10. A harvesting machine according to claim 4 wherein said first locating device is a laser scanner having means for sending and receiving laser-beams.

11. A harvesting machine according to claim 10, including means for periodically swivelling the laser scanner so that the laser beams cover a certain angle area.

12. A harvesting machine according to claim 4, wherein said first locating device is an ultrasonic sensor having an ultrasonic sending and receiving device.

13. A harvesting machine according to claim 4, wherein said first locating device is mounted on the cutterbar.

14. A harvesting machine according to claim 13, wherein said first locating device is mounted directly on the cutterbar's left border edge.

15. A harvesting machine according to claim 13, wherein said first locating device is mounted directly on the cutterbar's right border edge.

16. A harvesting machine according to claim 4, wherein said first locating device is mounted on the machine away from the cutterbar.

17. A harvesting machine according to claim 4, wherein said second locating device senses the crop edge in the catchment area of the cutterbar.

18. A harvesting machine according to claim 4, wherein said second locating device is arranged to sense the distance between the cutterbar border edge and the crop edge.

19. A harvesting machine according to claim 18, wherein said second locating device is designed as an ultrasonic sensor with an ultrasonic sending and receiving device.

20. A harvesting machine according to claim 18, wherein said second locating device is designed as a mechanical sensing head, which is moved in place by the crop edge.

21. A harvesting machine according to claim 18, wherein said second locating device provides an additional signal for the cutterbar utilization.

22. A harvesting machine according to claim 4, wherein said first locating device is pivotal around an axis.

23. A harvesting machine according to claim 22, wherein, depending on the pivoting angle, said locating device scans the crop edge in variable distances in front of the cutterbar.

24. A harvesting machine according to claim 22, wherein said first locating device is adjustable to two pivoting angles for the distant range scanning area and the short range scanning area of the crop edge.

25. A harvesting machine according to claim 22, wherein said first locating device is infinitely pivotal so that the crop edge is infinitely scannable between the short and distant ranges.

26. A harvesting machine according to claim 1, wherein said locating device is in the form of a digital camera which is positioned above the crops and tilted forwards towards the field.

27. A harvesting machine according to claim 26, wherein said digital camera's surveying area in front of the cutterbar to scan the crop edge is evaluated via digital image processing.

28. A harvesting machine according to claim 26, wherein the crop edge is determined at one spot in said digital camera's surveying area and the position of this spot is used as a locating signal.

29. A harvesting machine according to claim 26, wherein the course of the crop edge in said digital camera's surveying area are determined at several spots and these spots are used as locating signals.

30. A harvesting machine according to claim 4, wherein the positions of the crop edge, while driving, are scanned by at least one said locating device and are continuously stored in storage rings to produce a picture of the crop edge course.

31. A harvesting machine according to claim 30, wherein said crop edge course is processed by the controller for the automatic steering mechanism.

32. A harvesting machine according to claim 30, wherein said controller computes the mean of the scanned crop edge course by forming the sliding mean value over a certain time window.

33. A harvesting machine according to claim 32, wherein said mean crop edge course is processed by the controller to control the steering mechanism.

34. A method for automatically steering a self-propelled harvesting machine which has a cutter bar, steerable wheels, and a steering mechanism for the steerable wheels; the method including the steps of:

sensing the crop edge in front of the cutterbar in at least two separate distances and producing at least two separate locating signals;

receiving and processing the two locating signals together to determine a path of travel for the machine; and controlling the steering mechanism accordingly.

* * * * *